United States Patent
Eastman et al.

(10) Patent No.: US 10,280,044 B2
(45) Date of Patent: May 7, 2019

(54) IN-SERVICE REPAIR OF ELEVATOR BELT

(71) Applicant: Otis Elevator Company, Farmington, CT (US)

(72) Inventors: Scott Alan Eastman, Glastonbury, CT (US); John P. Wesson, West Hartford, CT (US); Daniel A. Mosher, Glastonbury, CT (US); Wenping Zhao, Glastonbury, CT (US); William Eaton Holden, III, Berlin, CT (US); Michael Paul Humbert, Meriden, CT (US); Brad Guilani, Woodstock Valley, CT (US); Gopal R. Krishnan, Wethersfield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 136 days.

(21) Appl. No.: 15/264,791

(22) Filed: Sep. 14, 2016

(65) Prior Publication Data
US 2017/0073195 A1   Mar. 16, 2017

Related U.S. Application Data

(60) Provisional application No. 62/218,191, filed on Sep. 14, 2015.

(51) Int. Cl.
*B66B 19/00* (2006.01)
*B66B 7/06* (2006.01)
(Continued)

(52) U.S. Cl.
CPC .......... *B66B 19/007* (2013.01); *B29C 73/02* (2013.01); *B29C 73/34* (2013.01); *B66B 7/062* (2013.01);
(Continued)

(58) Field of Classification Search
CPC ......... B66B 19/007; B66B 7/062; B66B 7/12; B66B 9/00; B29C 73/02; B29C 73/34
See application file for complete search history.

(56) References Cited

U.S. PATENT DOCUMENTS

| | | | | |
|---|---|---|---|---|
| 4,211,743 A | * | 7/1980 | Nauta | B29C 51/22 264/284 |
| 4,224,601 A | * | 9/1980 | Davidson | G01D 15/06 347/161 |

(Continued)

FOREIGN PATENT DOCUMENTS

| | | |
|---|---|---|
| CN | 201872353 U | 6/2011 |
| JP | H08133650 A | 5/1996 |
| WO | 2015076827 A1 | 5/2015 |

OTHER PUBLICATIONS

Database WPI Week 201158, Thomson Scientific, London, GB, AN 2011-J47111, XP002765842, 2 pages.
European Search Report for application EP 16188708.8, dated Jan. 23, 2017, U320659EP, 10 pages.

*Primary Examiner* — Michael A Riegelman
(74) *Attorney, Agent, or Firm* — Cantor Colburn LLP (57) ABSTRACT

A servicing device for a belt of an elevator system is provided including a housing and a guide member coupled to the housing. The guide member and the housing are disposed on opposite sides of the belt. At least one reservoir is disposed within the housing. The at least one reservoir contains one or more restoring materials. An applicator is configured to apply the one or more restoring materials to an adjacent surface of the belt. Application of the one or more restoring materials is configured to modify the geometry of the belt such that the modified geometry is substantially identical to the original geometry of the belt.

9 Claims, 9 Drawing Sheets

(51) Int. Cl.
    *B66B 7/12*     (2006.01)
    *B29C 73/02*     (2006.01)
    *B29C 73/34*     (2006.01)
    *B66B 9/00*     (2006.01)
    B29K 75/00     (2006.01)
    B29L 29/00     (2006.01)

(52) U.S. Cl.
    CPC ............... *B66B 7/12* (2013.01); *B66B 9/00* (2013.01); *B29K 2075/00* (2013.01); *B29L 2029/00* (2013.01)

(56) References Cited

U.S. PATENT DOCUMENTS

| | | | | |
|---|---|---|---|---|
| 5,792,262 | A * | 8/1998 | Bohn | ............... B41F 27/02 101/389.1 |
| 7,926,649 | B2 * | 4/2011 | Goser | ............... B29C 43/22 187/251 |
| 8,052,820 | B2 * | 11/2011 | O'Donnell | ............... B32B 3/08 156/179 |
| 2007/0014886 | A1 * | 1/2007 | Hennessey | ............... B29C 43/222 425/471 |
| 2008/0156592 | A1 * | 7/2008 | Thompson | ............... B29C 59/02 187/411 |
| 2010/0040837 | A1 * | 2/2010 | Planeta | ............... B29C 55/06 428/187 |
| 2010/0133046 | A1 * | 6/2010 | Allwardt | ............... B66B 7/08 187/251 |

\* cited by examiner

FIG. 1A

Prior Art

FIG. 1C

Prior Art

IN-SERVICE REPAIR OF ELEVATOR BELT

CROSS REFERENCE TO RELATED APPLICATIONS

This application claims the benefit of U.S. Provisional Application Ser. No. 62/218,191, filed Sep. 14, 2015, the entire contents of which are incorporated herein by reference.

BACKGROUND

The subject matter disclosed herein relates to elevator systems suspended by belts.

Elevator systems utilize belts, for example, coated steel belts, operably connected to an elevator car, and driven by a motor to propel the elevator car along a hoistway. Coated steel belts in particular include a plurality of wires located at least partially within a jacket material, for example a thermoplastic elastomer (TPE) material. The plurality of wires is often arranged into one or more strands and the strands are then arranged into one or more cords. In an exemplary belt construction, a plurality of cords is typically arranged equally spaced within a jacket in a widthwise direction. The motor drives a sheave, in this case a traction sheave, over which the belt is routed. The belt gains traction at the traction sheave, such that rotation of the traction sheave consequently drives movement of the elevator car.

Key characteristics of the jacket, which allow for smooth operation of the elevator system and a desired amount of traction over the traction sheave include surface roughness, surface chemistry, and frictional properties of the jacket material. Wear of the belt and jacket material over time alters the surface characteristics of the jacket, thereby altering traction, noise, and ride quality of the elevator system.

BRIEF DESCRIPTION

According to an embodiment, a servicing device for a belt having an original geometry and configured for use in an elevator system is provided including a housing and a guide member coupled to the housing. At least one reservoir is disposed within the housing. The at least one reservoir contains one or more restoring materials. An applicator is configured to apply the one or more restoring materials to an adjacent surface of the belt. Application of the one or more restoring materials is configured to modify the geometry of the belt such that the modified geometry is substantially identical to the original geometry of the belt.

In addition to one or more of the features described above, or as an alternative, in further embodiments the servicing device is fixed at a hoistway of the elevator system and the belt is configured to move relative to the servicing device.

In addition to one or more of the features described above, or as an alternative, in further embodiments the servicing device is connected to the belt and is configured to move relative to the belt.

In addition to one or more of the features described above, or as an alternative, in further embodiments the one or more restoring materials includes a first restoring material and a second restoring material. The first restoring material is configured to promote adhesion between an existing material of the belt and the second restoring material.

In addition to one or more of the features described above, or as an alternative, in further embodiments further comprising a curing attachment configured to cure the restoring material.

In addition to one or more of the features described above, or as an alternative, in further embodiments the curing attachment is positioned generally downstream from the at least one reservoir with respect to a direction of movement of at least one of the belt and the servicing device.

In addition to one or more of the features described above, or as an alternative, in further embodiments further comprising a pretreatment attachment configured to prepare a surface of the belt. The pretreatment attachment is mounted to the housing generally upstream from the reservoir with respect to a direction of movement of at least one of the belt and the servicing device.

In addition to one or more of the features described above, or as an alternative, in further embodiments further comprising an attachment including at least one resurfacing roller configured to apply a selected pressure to the belt to modify a surface finish of an outer surface of the belt.

In addition to one or more of the features described above, or as an alternative, in further embodiments further comprising a mechanism for measuring a thickness of the belt.

In addition to one or more of the features described above, or as an alternative, in further embodiments the restoring material is a surface treatment configured to alter at least one of friction, noise, and traction of the belt.

In addition to one or more of the features described above, or as an alternative, in further embodiments the one or more restoring materials is applied by printing or fused deposition.

According to another embodiment, an elevator system is provided including an elevator car, a motor, and a traction sheave operably coupled to the motor to drive rotation of the traction sheave. At least one belt is operably connected to the elevator car and has an original geometry. The at least one belt is arranged in frictional contact with the traction sheave such that rotation of the traction sheave urges movement of the elevator car. A servicing device for the at least one belt includes a housing and a guide member coupled to the housing. At least one reservoir is disposed within the housing. The at least one reservoir contains one or more restoring materials. An applicator is configured to apply the one or more restoring materials to an adjacent surface of the belt. Application of the one or more restoring materials is configured to modify the geometry of the belt such that the modified geometry is substantially identical to the original geometry of the belt.

In addition to one or more of the features described above, or as an alternative, in further embodiments the servicing device is fixed at a hoistway of the elevator system and the at least one belt is configured to move relative to the servicing device.

In addition to one or more of the features described above, or as an alternative, in further embodiments the servicing device is configured to move relative to the at least one belt.

In addition to one or more of the features described above, or as an alternative, in further embodiments the one or more restoring materials includes a first restoring material and a second restoring material. The first restoring material is configured to promote adhesion between an existing material of the at least one belt and the second restoring material.

In addition to one or more of the features described above, or as an alternative, in further embodiments further comprising a curing attachment configured to cure the restoring material.

In addition to one or more of the features described above, or as an alternative, in further embodiments the curing attachment is positioned generally downstream from the at least one reservoir with respect to a direction of movement of at least one of the belt and the servicing device.

According to another embodiment, a method for altering a geometry of a belt of an elevator system is provided including positioning a servicing device adjacent an outer surface of the belt. At least one of the servicing device and the belt is then moved. A restoring material is applied to an existing material of the belt. The at least one restoring material is cured such that a geometry of the belt is substantially identical to an original geometry of the belt.

In addition to one or more of the features described above, or as an alternative, in further embodiments further comprising pretreating a surface of the belt prior to applying the at least one restoring material.

In addition to one or more of the features described above, or as an alternative, in further embodiments further comprising altering a surface roughness of the belt via application of a resurfacing roller to the belt at the selected pressure.

In addition to one or more of the features described above, or as an alternative, in further embodiments further comprising measuring a thickness of the belt, determining a quantity of restoring material necessary to achieve the original geometry of the belt, and adjusting the position of the at least one applicator configured to apply the restoring material to the belt.

The detailed description explains the invention, together with advantages and features, by way of examples with reference to the drawings.

DETAILED DESCRIPTION

Figure 1A:
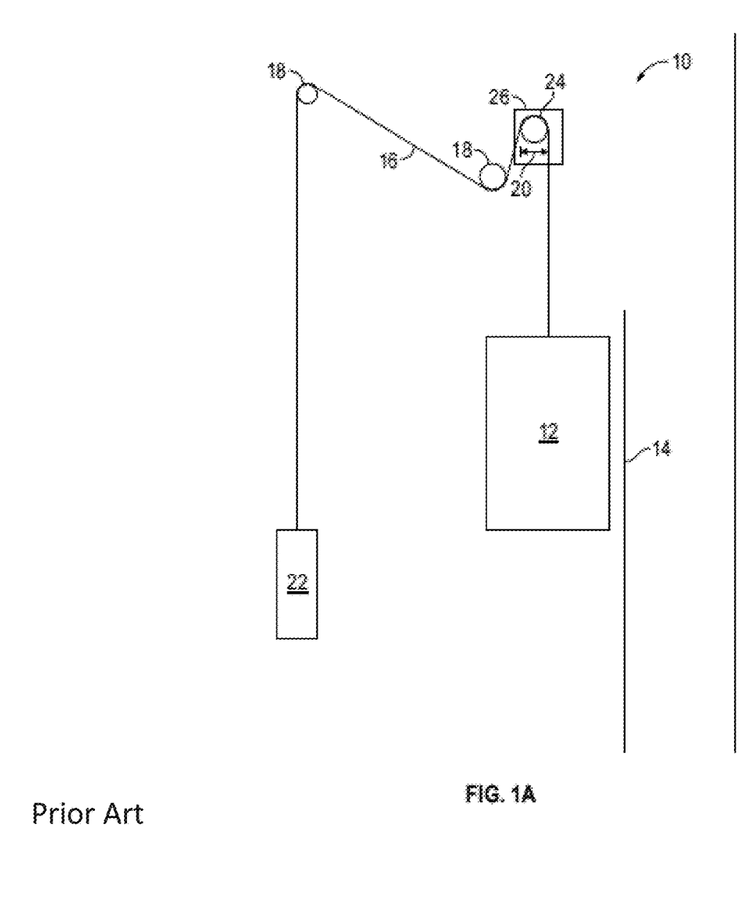
FIG. 1A is a schematic of an exemplary elevator system having a 1:1 roping arrangement.
Figure 1B:
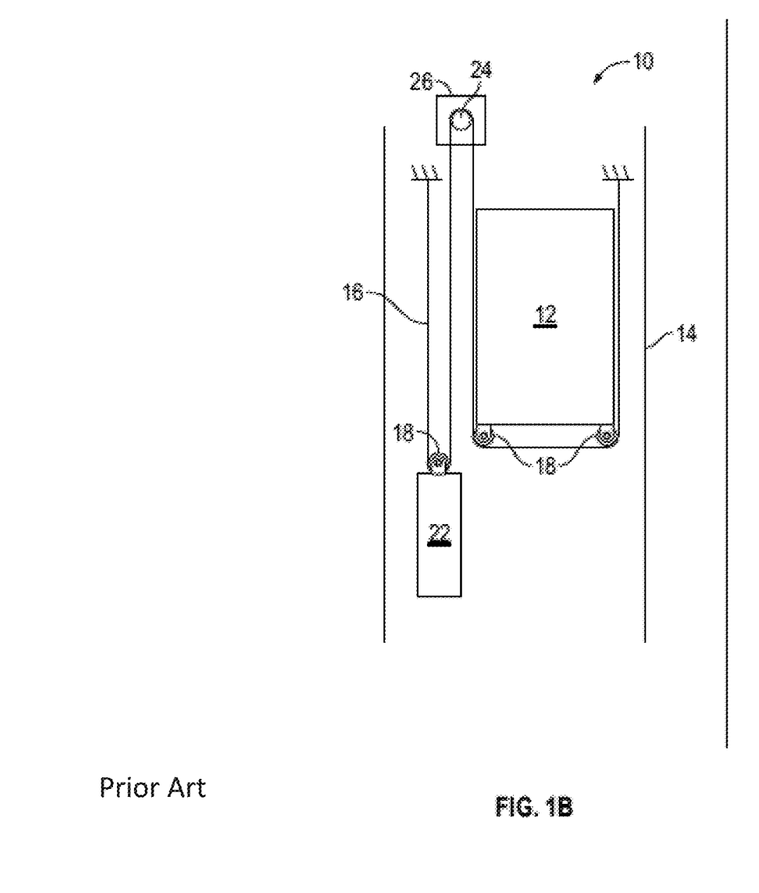
FIG. 1B is a schematic of another exemplary elevator system having a different roping arrangement.
Figure 1C:
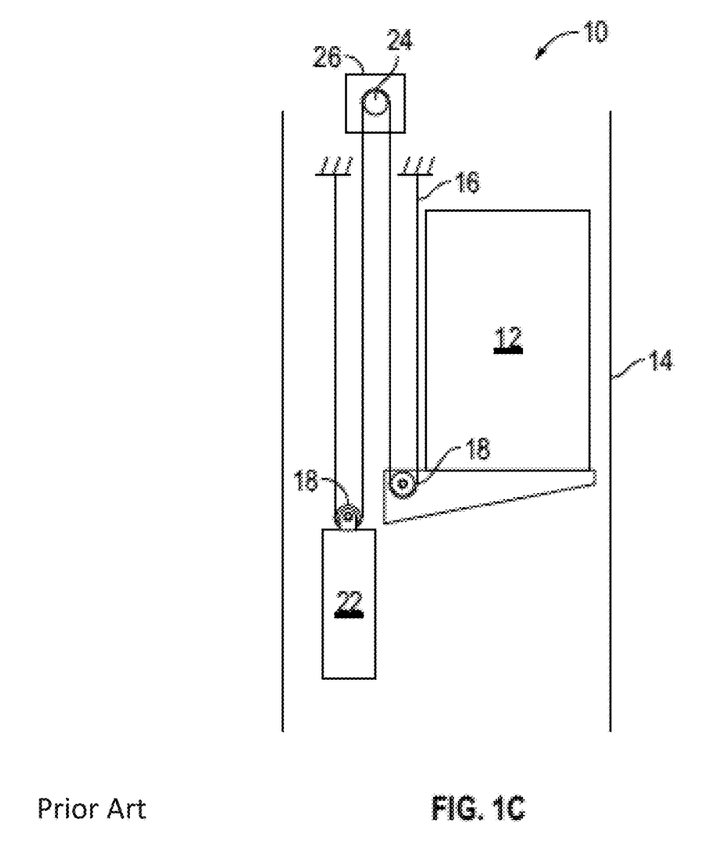
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more deflector sheaves 18 to be routed around various components of the elevator system 10. The one or more belts 16 could also be connected to a counterweight 22, which is used to help balance the elevator system 10 and reduce the difference in belt tension on both sides of the traction sheave during operation. While the embodiments herein are described with reference to coated steel belts, it is to be appreciated that the disclosure herein may similarly be applied to other tension members, such as coated steel ropes for example.

The deflector sheaves 18 each have a diameter 20, which may be the same or different than the diameters of the other deflector sheaves 18 in the elevator system 10. At least one of the sheaves could be a traction sheave 24. The traction sheave 24 is driven by a machine 26. Movement of the traction sheave 24 by the machine 26 drives, moves and/or propels (through traction) the one or more belts 16 that are routed around the traction sheave 24.

In some embodiments, the elevator system 10 could use two or more belts 16 for suspending and/or driving the elevator car 12. In addition, the elevator system 10 could have various configurations such that either both sides of the one or more belts 16 engage the one or more deflector sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more deflector sheaves 18 thereon engaging the one or more belts 16 and the one or more belts 16 can terminate elsewhere, typically at a structure within the hoistway 14 (such as for a machineroomless elevator system) or within the machine room (for elevator systems utilizing a machine room). The number of deflector sheaves 18 used in the arrangement determines the specific roping ratio (e.g., the 2:1 roping ratio shown in FIGS. 1B and 1C or a different ratio). FIG. 1C also provides a cantilevered type elevator. The disclosure provided herein could be used on elevator systems other than the exemplary types shown in FIGS. 1A, 1B and 1C.

Figure 2:
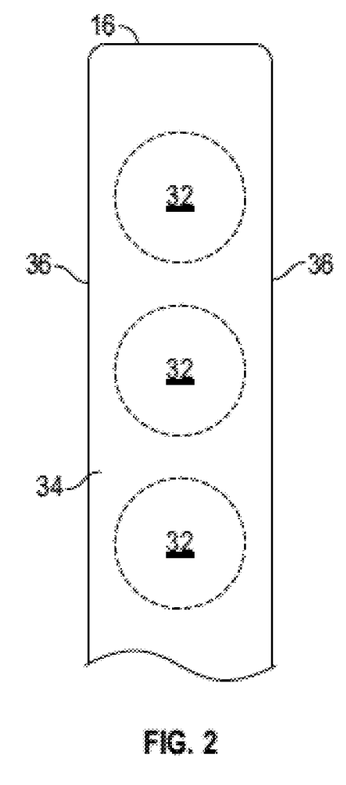
FIG. 2 is a cross-sectional view of an embodiment of an elevator belt.
Figure 3:
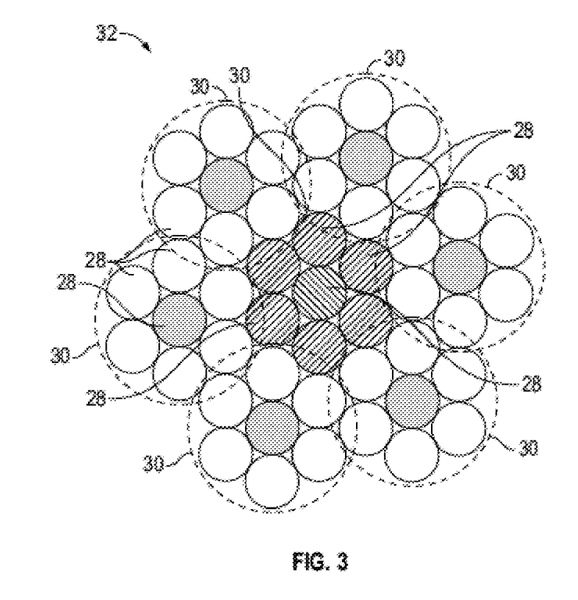
FIG. 3 is a cross-sectional view of an embodiment of a cord for an elevator belt.

FIG. 2 provides a schematic of an example of a belt construction or design. Each belt 16 is constructed of a plurality of wires 28 (e.g. twisted into one or more strands 30 and/or cords 32 as shown in FIG. 3) in a jacket 34. As seen in FIG. 2, the belt 16 has an aspect ratio greater than one (i.e. belt width is greater than belt thickness) such that the belt 16 has a generally rectangular geometry. The belts 16 are constructed to have sufficient flexibility when passing over the one or more deflector sheaves 18 to provide low bending stresses, meet belt life requirements, and have smooth operation, while being sufficiently strong to meet strength requirements for suspending and/or driving the elevator car 12 and counterweight 22. The wires 28 may be steel, or formed from other metals. Alternatively, the cords could be formed from fiber bundles and have various shapes and sizes. The jacket 34 could be any suitable material, including a single material, multiple materials, two or more layers using the same or dissimilar materials, and/or a film. In one arrangement, the jacket 34 could be a polymer, such as a thermoplastic elastomer, applied to the cords 32 using, for example, an extrusion or a mold wheel process.

The jacket 34 can substantially retain the cords 32 therein. The phrase substantially retain means that the jacket 34 has sufficient engagement with the cords 32 to transfer torque from the machine 26 through the jacket 34 to the cords 32 to drive movement of the elevator car 12. The jacket 34 could completely envelop the cords 32 (such as shown in FIG. 2), substantially envelop the cords 24, or at least partially envelop the cords 32.

Figure 4:
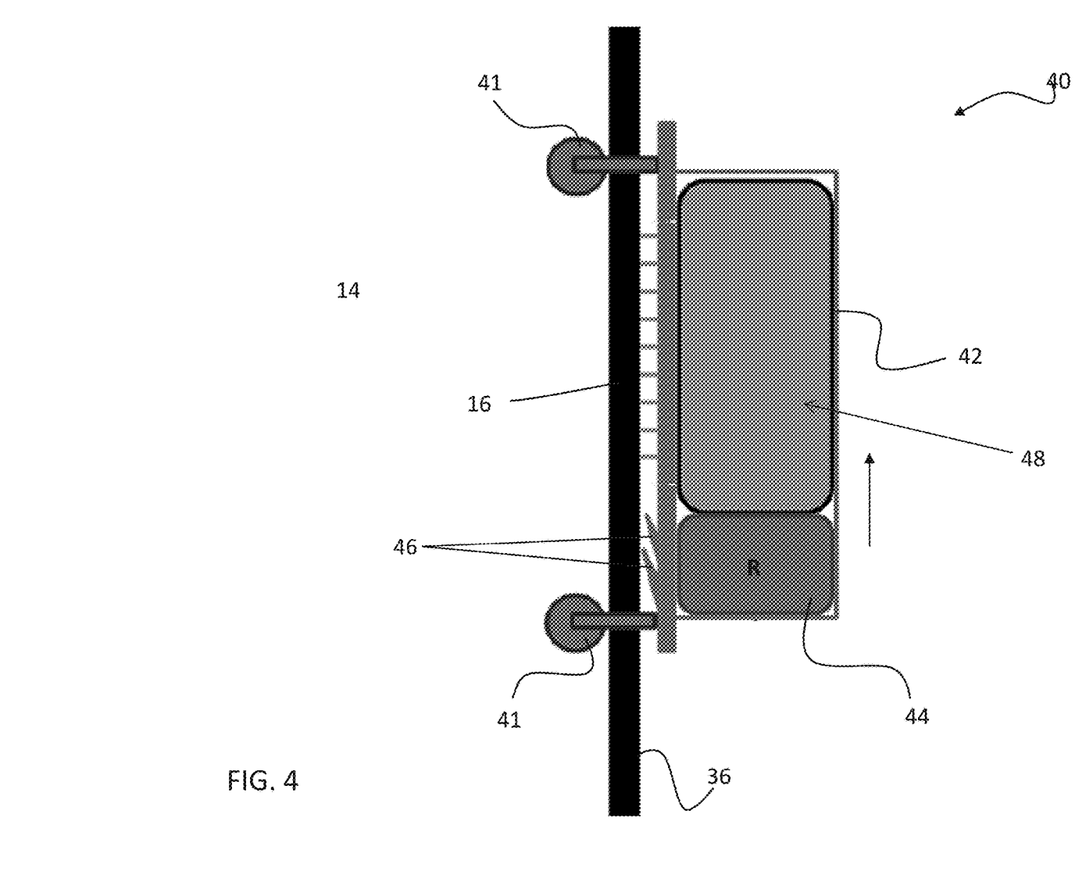
FIG. 4 is a cross-sectional view of an embodiment of a belt servicing apparatus for an elevator system.
Figure 4A:
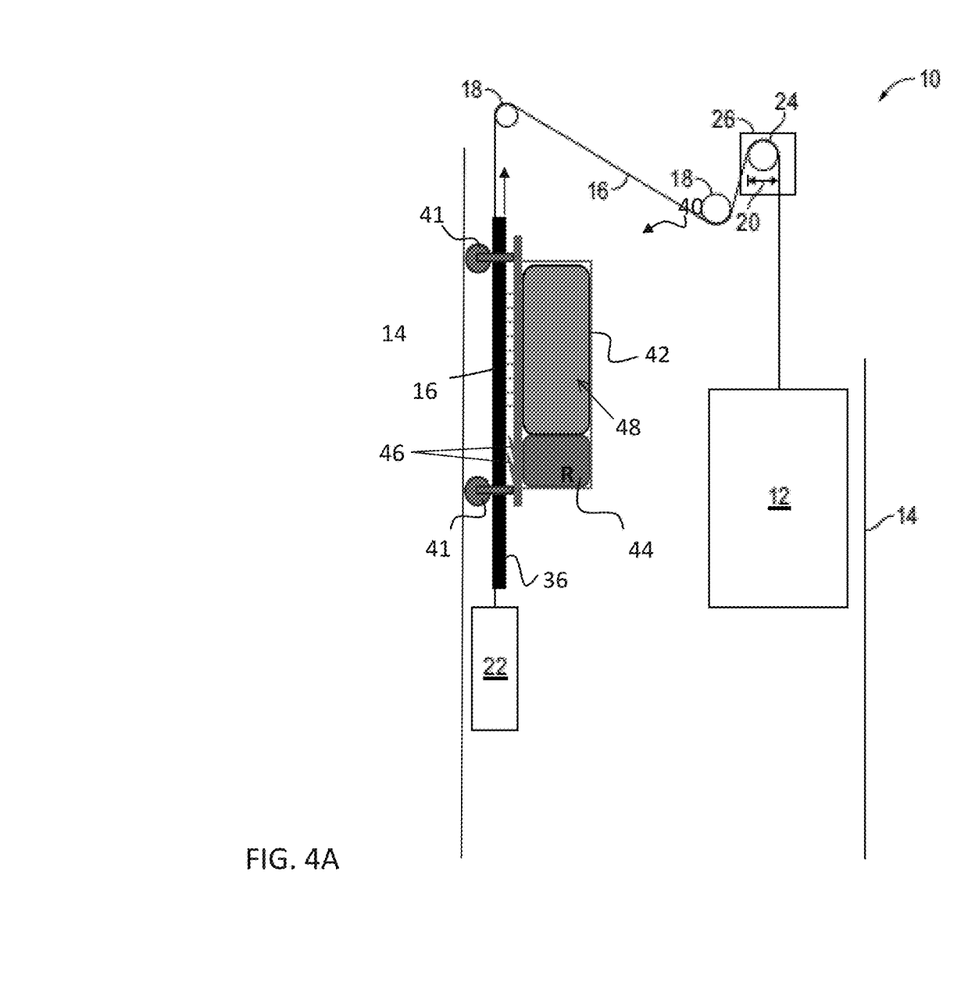
FIG. 4A is a cross-sectional view of an embodiment of a belt servicing apparatus mounted within a hoistway of an elevator system according to an embodiment.
Figure 5:
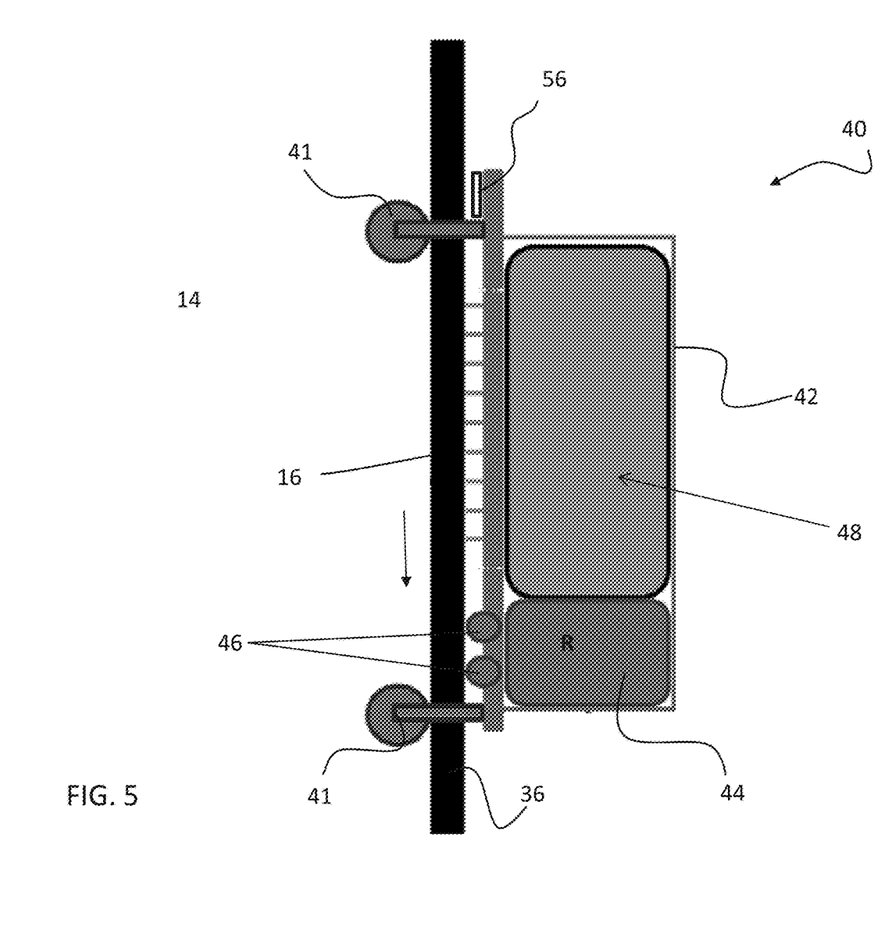
FIG. 5 is a cross-sectional view of another embodiment of a belt servicing apparatus for an elevator system.

Over time, by operation of the elevator system 10, the jacket 34 wears, altering a surface roughness of an outer surface 36 of the jacket 34. Altering of the geometry and surface properties affects performance of the belt 16 and operational characteristics of the elevator system 10, such as noise, vibration and ride quality for example. To restore one or more functional characteristics of the belt 16, such as the geometry thereof for example, a belt servicing apparatus 40, such as shown in FIGS. 4 and 5 may be utilized.

The belt servicing apparatus 40 includes at least one guide member 41 and a housing 42 in which one or more components of the belt servicing apparatus 40 are positioned. The guide members 41 are positioned on an opposing side of the belt 16 from the housing 42 and are configured to guide movement of at least one belt 16 relative to the belt servicing device 40. Disposed within a portion of the housing 42 is one or more reservoirs 44 containing at least one restoring material R to be applied over a worn portion of the belt jacket 34. Embodiments where the restoring material is a liquid or a non-liquid, such as a tape for example, are both within the scope of the disclosure. The restoring material within the reservoir 44 may be selected from any flexible or ductile material capable of meeting the requirements defined by a specification of the belt, including but not limited to urethane, epoxy, and acrylic for example. In one embodiment, the restoring material may need to be cured to achieve the properties necessary for normal operation of the belt.

The restoring material may be a surface treatment configured to alter the surface chemistry or frictional characteristics to address specific noise quality issues. Examples of such surface treatments include, but are not limited to wax, surfactant or other lubricating or low surface energy materials to reduce friction and address belt noise issues for example. Alternatively, or in addition, the restoring material may be a surface treatment including adhesives, plasticizing agents or other high friction or high surface energy materials intended to address the low traction of the belts.

In addition, in some embodiments, a plurality of restoring materials may be disposed within the at least one reservoir 44. For example, in the non-limiting embodiment illustrated in FIG. 6, the plurality of restoring materials include a first restoring material R1 comprising a primer and the second restoring material R2 configured to build up the thickness of a worn portion of the belt 16. Application of the primer R1 is configured to promote adhesion between the second restoring material R2 and at least one of the existing jacket material 34 and/or the cords 32. It should be understood that the illustrated of the at least one reservoir 44 indicated in the FIGS. is intended as an example, and other locations of the reservoir 44 within the belt servicing apparatus 40 are within the scope of the disclosure.

Mounted to the housing 42 generally adjacent to the at least one reservoir 44 is an applicator 46 for applying the material from the reservoir 44 to an adjacent surface 36 of the belt 16. In some embodiments, the one or more applicators 46 may include a blade (FIG. 4) or a roller (FIG. 5), configured to directly contact the belt 16. Alternatively, the applicator 46 may include a spray nozzle configured to spray a restoring material from the at least one reservoir 44 onto the belt 16.

The housing 42 of the belt servicing device 40 may be configured to receive a plurality of attachments or subsystems. For example, in embodiments where the restoring material R requires curing via application of heat or other energy, the device 40 may include a curing attachment 48, for example having an ultraviolet or infrared lamp. However, in other embodiments, the ultraviolet or infrared lamp may be positioned within the housing 42. The curing attachment 48 is configured to transmit heat or other energy to a directly adjacent portion of the belt 16. By positioning the curing attachment 48 generally downstream from the reservoir 44 with respect to movement of the belt 16 relative to the belt servicing device 40, restoring material R may first be applied to a worn portion of the belt 16 and then cured by the curing attachment 48.

Figure 6:
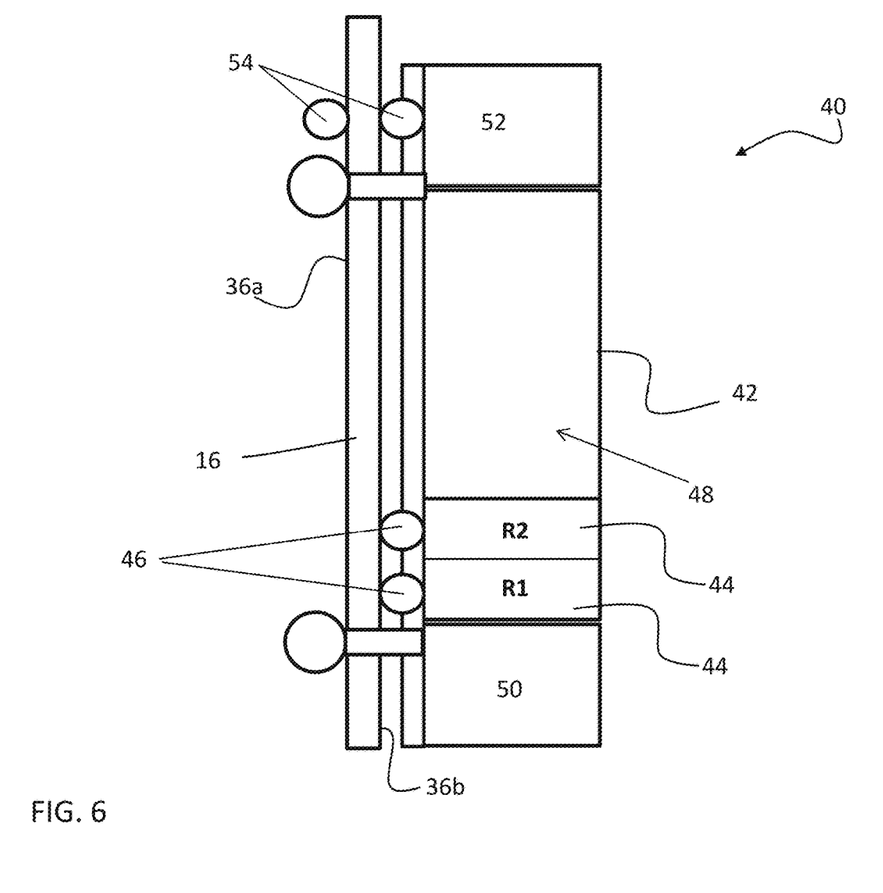
FIG. 6 is a cross-sectional view of another embodiment of a belt servicing apparatus.

Alternatively, or in addition, an attachment 50 configured to automatically prepare the surface of the belt 16, such as by removing debris therefrom or by application of one or more cleaning materials for example, may be connected to a portion of the housing 42 (see FIG. 6). In such embodiments, this pretreatment attachment 50 is generally mounted to the housing 42 upstream from the at least one reservoir 44 such that the belt 16 is cleaned prior to application of the restoring material R. In embodiments of the belt servicing device 40 that do not include the pretreatment attachment 50, cleaning or other treatment of the belt 16 prior to application of the restoring material R may be performed manually or by another device.

With further reference to FIG. 6, yet another attachment 52 configured for use with the belt servicing device 40 includes at least one resurfacing roller 54 rotatable about an axis. In one embodiment, the attachment 52 includes two resurfacing rollers 54 positioned on opposing sides 36a and 36b of the belt 16, such that the belt 16 is positioned therebetween. The resurfacing rollers 54 may be formed from a metal or other heat-conductive material, and have a non-stick roller outer surface 48. The outer surface of the rollers 54 may be configured with a surface roughness substantially identical to a selected surface roughness of the jacket 34 after refinishing. It is to be appreciated that while two resurfacing rollers are shown in the embodiment of FIG. 6, in other embodiments, the belt 16 may be positioned between one resurfacing roller 42 and another surface, for example a low friction plate or other surface. Such embodiments may be utilized for resurfacing one side of the belt 16 at a time, or in situations where resurfacing of only one side of the belt 16 is desired.

To restore the rectangular geometry and surface properties of the jacket 34, the belt servicing device 40 is arranged at some position within the hoistway 14. When installed, one or more belts 16 are positioned between the guide members 41 and the housing 42. In one embodiment, the belt servicing device 40 remains fixed at a location within the hoistway 14 and the elevator car 12 is driven between landings to move the at least one belt 16 relative to the belt servicing device 40. In another embodiment, however, the belt servicing device 40 may be configured to move relative to a surface 36 of the one or more belts 16. For example, the at least one guide roller 41 may be used to drive the belt servicing device 40 along a length of the at least one belt 16.

The belt restoring device 40 may be configured to restore the original geometry of the belt 16 in a single pass. In another embodiment, however, multiple passes of the belt restoring device 40 may be necessary to build up the restoring material to achieve the original geometry of the belt 16. As the belt 16 moves relative to the belt servicing device 40, the belt 16 passes by the at least one reservoir 44 and any of the other attachments 48, 50, 52 integrally formed with or coupled to the housing 42 in a desired sequence. For example, as the belt 16 moves relative to the belt servicing device 40, the applicators 46 apply a coating of restoring material to the surface 36 of the belt 16 to achieve a rectangular geometry substantially identical to the original geometry of the belt 16. The restoring material R applied to the belt 16 may then be cured, such as by the heat generated by a curing attachment 48 of the device 40.

In embodiments of the belt servicing device 40 including attachment 52 having at least one resurfacing roller 54, the resurfacing roller 54 may be heated to soften the outer surface 36 and imprint the surface roughness from the resurfacing roller 54 into the outer surface 36 of the jacket 34. In other embodiments, the heat or energy applied to the belt 16 via the curing attachment 48 is configured to soften the belt 16 such that the at least one resurfacing roller 54 need not be heated. In one embodiment, attachment 52 includes at least one tensioning spring such that the resurfacing roller 54 contacts the belt 16 with a desired pressure. Once through the resurfacing roller 54, the outer surface 36 rehardens with the selected surface roughness matching that of the resurfacing roller 54. In another embodiment, the resurfacing roller 54 may be used to finalize or adjust the thickness of the belt 16. In such instances, a fixed gap of a desired size is formed between the resurfacing rollers 54 such that the belt 16 is sized to a desired thickness as it moves there through.

In addition, the belt restoring device 40 may be configured to measure a thickness of the jacket 34 to determine an appropriate quantity of restoring material R to apply to a portion of the belt 16 via the at least one applicator 46. Examples of devices 56 configured to measure the thickness of the jacket 36 include a magnetic induction probe, a magnetic pin or brush, and an optical detector for example. In response to the feedback provided by the measuring device 56, a position of the at least one applicator 46 may be modified to vary the amount of restoring material applied to the belt 16.

In some embodiments, the one or more applicators 46 may include a printer or a fused deposition device. The restoring material may be added to the belt 16 by printing or fused deposition. An example material to be applied by printing or fused deposition includes thermoplastic polyurethane (TPU).

The belt servicing device 40 disclosed herein allows field repair of a worn belt 16 to restore the original geometry and improve traction and other operational characteristics of the belt 16 and the elevator system 10. The device and method does not require unroping of the belt 16 from its installed position in the hoistway 14 for resurfacing and thus saves time and labor. Further, the device and method allows for service of a worn belt, thus avoiding premature replacement of the belt.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A servicing device configured for use with a belt of an elevator system having an original geometry, the servicing device comprising:

a housing;
a guide member coupled to the housing such that the guide member and the housing are disposed adjacent opposing surfaces of the belt;
at least one reservoir disposed within the housing, the at least one reservoir containing one or more restoring materials;
an applicator configured to apply the one or more restoring materials to an adjacent surface of the belt, wherein application of the one or more restoring materials is configured to modify a geometry of the belt such that the modified geometry is substantially identical to an original geometry of the belt; and
a curing attachment arranged downstream from the applicator with respect to a path of relative motion between the at least one belt and the servicing device.

2. The servicing device of claim 1, wherein the servicing device is fixed at a hoistway of the elevator system and the belt is configured to move relative to the servicing device.

3. The servicing device of claim 1, wherein the servicing device is connected to the belt and is configured to move relative to the belt.

4. The servicing device of claim 1, further comprising a mechanism for measuring a thickness of the belt.

5. The servicing device of claim 1, wherein the restoring material is a surface treatment configured to alter at least one of friction, noise, and traction of the belt.

6. The servicing device of claim 1, wherein the one or more restoring materials is applied by printing or fused deposition.

7. An elevator system comprising:

an elevator car;
a motor;
a traction sheave operably connected to the motor drive rotation of the traction sheave;
at least one belt operably connected to the elevator car, the at least one belt having an original geometry and being arranged in frictional contact with the traction sheave such that rotation of the traction sheave urges movement of the elevator car; and
a servicing device for the at least one belt including:
a housing;
a guide member coupled to the housing;
at least one reservoir disposed within the housing, the at least one reservoir containing one or more restoring materials;
an applicator configured to apply the one or more restoring materials to an adjacent surface of the at least one belt, wherein application of the one or more restoring material modifies a geometry of the at least one belt such that the modified geometry is substantially identical to the original geometry of the at least one belt; and
a curing attachment arranged downstream from the applicator with respect to a path of relative motion between the at least one belt and the servicing device.

8. The elevator system of claim 7, wherein the servicing device is fixed at a hoistway of the elevator system and the at least one belt is configured to move relative to the servicing device.

9. The elevator system of claim 7, wherein the servicing device is configured to move relative to the at least one belt.

* * * * *